United States Patent Office 3,072,716
Patented Jan. 8, 1963

3,072,716
SUBSTITUTED INDENES
Charles Ferdinand Huebner, Chatham, N.J., assignor to Ciba Corporation, a corporation of Delaware
No Drawing. Filed Mar. 18, 1959, Ser. No. 800,088
12 Claims. (Cl. 260—501)

This invention concerns indene compounds. More particularly, it relates to 3-carbocyclic aryl-lower alkyl-2-tertiary amino-lower alkyl-indenes, in which the tertiary amino group is separated from the 2-position of the indene nucleus by at least two carbon atoms, the salts and quaternary ammonium compounds thereof, as well as process for the preparation of such compounds.

An aryl-lower alkyl radical stands particularly for monocyclic or bicyclic carbocyclic aryl-lower alkyl radicals, in which the lower alkyl portion is represented by a lower alkylene radical having from one to seven carbon atoms, e.g. methylene, 1,1-ethylene, 1,2-ethylene, 1,1-propylene, 1,2-propylene, 2,2-propylene, 1,3-propylene or 1,4-butylene. The carbocyclic aryl portion of the carbocyclic aryl-lower alkyl radical is especially a monocyclic carbocyclic aryl, i.e. a phenyl, radical, or a bicyclic carbocyclic aryl, i.e. naphthyl, e.g. 1-naphthyl or 2-naphthyl, radical, which radicals may be unsubstituted or may contain as substituents lower alkyl, e.g. methyl or ethyl, etherified hydroxyl, such as lower alkoxy, e.g. methoxy or ethoxy, or lower alkylene-dioxy, e.g. methylenedioxy, halogen, e.g. fluorine, chlorine or bromine, etherified mercapto, such as lower alkyl-mercapto, e.g. methylmercapto or ethylmercapto, nitro, amino, particularly tertiary amino, for example, N,N-di-lower alkyl amino, e.g. dimethylamino.

The lower alkyl portion of the tertiary amino-lower alkyl group may be represented by a lower alkylene radical containing from two to seven carbon atoms, which separates the tertiary amino group by at least two carbon atoms from the carbon atom at the 2-position of the indene nucleus. Such alkylene radicals are, for example, 1,2-ethylene, 1-methyl-1,2-ethylene, 2-methyl-1,2-ethylene or 1,3-propylene. The lower alkylene radical or part of it may also be incorporated into a heterocyclic ring system, such as a saturated heterocyclic ring system, containing the tertiary amino group as a ring member.

Tertiary amino groups are particularly N,N-di-lower hydrocarbonamino or N,N-lower alkylene-imino groups. Lower hydrocarbon radicals of an N,N-di-lower hydrocarbon amino group are, for example, lower alkyl, lower alkenyl, lower cycloalkyl, monocyclic carbocyclic aryl or monocyclic carbocyclic aryl-lower alkyl radicals containing from one to seven carbon atoms, e.g. methyl, ethyl, propyl, isopropyl, butyl, isobutyl, pentyl, neopentyl, allyl, methallyl, cyclopentyl, cyclohexyl, phenyl or benzyl. Therefore, such N,N-di-lower hydrocarbonamino groups are represented, for example, by N,N-di-lower alkyl-amino groups, e.g. N,N-dimethylamino, N-ethyl-N-methyl-amino, N,N-diethylamino, N,N-dipropylamino or N,N-diisopropylamino, or N-methyl-N-cyclopentylamino or N-methyl-N-benzyl-amino groups. The lower alkylene radicals of an N,N-lower alkylene-imino group contain from four to six carbon atoms which may be arranged in a carbon chain, or such carbon chain may be interrupted by a hetero atom such as nitrogen, sulfur or oxygen and thus form a lower azaalkylene, lower thiaalkylene or a lower oxaalkylene radical. Together with the nitrogen atom such alkylene radicals represent, for example, N,N-lower alkylene-imino radicals, in which lower alkylene contains from four to six carbon atoms, such as pyrrolidino radicals, e.g. pyrrolidino, piperidino radicals, e.g. piperidino, 2-methyl-piperidino, 4-methyl-piperidino, 3-hydroxy-piperidino, 3-acetoxy-piperidino or 3-hydroxymethyl-piperidino, or hexamethyleneimino, N,N-lower oxaalkyleneimino radicals, in which lower oxaalkylene contains preferably four carbon atoms, e.g. morpholino, N,N-lower thiaalkylene-imino radicals, in which lower thiaalkylene contains preferably four carbon atoms, e.g. thiamorpholino, or N,N-lower azaalkylene-imino radicals, in which lower azaalkylene contains preferably four carbon atoms, such as, piperazino radicals, e.g. 4-methyl-piperazino, 4-hydroxyethyl-piperazino or 4-acetoxyethyl-piperazino. The tertiary amino-lower alkyl radicals may also be represented by a heterocyclic or a heterocyclic-lower alkyl radical, in which the tertiary amino group is part of the heterocycle, which is connected through one of its carbon atoms directly or through a lower alkylene radical, e.g. methylene, 1,1-ethylene or 1,2-ethylene, with the 2-position of the indene ring. Such radicals are represented, for example, by a 1-methyl-piperidino-(3)-methyl or a 1-methyl-piperidino-(4) radical.

The 1-position of the indene nucleus is preferably unsubstituted, or, if substituted, contains a hydrocarbon radical, particularly lower alkyl, e.g. methyl; monocyclic aryl, e.g. phenyl; or monocyclic aryl-lower alkyl, e.g. benzyl.

The aromatic portion of the 2-indene nucleus may be unsubstituted or may contain at least one substituent, which may be attached to any of the four positions available for substitution. Such substituents may be the same which may substitute the aromatic portion of the 3-aryl-lower alkyl radical; they are more especially halogen atoms, e.g. fluorine, chlorine or bromine; lower alkoxy, e.g. methoxy or ethoxy; lower alkyl, e.g. methyl or ethyl; nitro; or amino, e.g. dimethylamino.

Salts of the compounds of this invention are particularly therapeutically acceptable acid addition salts with inorganic acids, such as hydrohalic acids, e.g. hydrochloric or hydrobromic acid; sulfuric or phosphoric acids; or with organic acids, such as acetic, propionic, glycolic, lactic, pyruvic, malonic, succinic, maleic, fumaric, malic, tartaric, citric, benzoic, cinnamic, mandelic, salicyclic, 4-amino-salicylic, 2-phenoxybenzoic or 2-acetoxy-benzoic, methane sulfonic, ethane sulfonic or hydroxyethane sulfonic acid or amino acids, e.g. methionine, tryptophane, lysine or arginine. Salts, which are primarily prepared for identification purposes, are particularly those with acidic organic nitro compounds, e.g. picric, picrolonic or flavianic acid; or metal complex acids, e.g. phosphotungstic, phosphomolybdic, chloroplatinic or Reinecke acid. Mono or poly-salts may be formed according to the number of salt forming groups present in a molecule and the procedure used for the preparation of such salts.

Quaternary ammonium compounds of the 3-carbocyclic aryl-lower alkyl-2-tertiary amino-lower alkyl-2-indenes of this invention may be either mono- or bisquaternary ammonium compounds depending on the conditions used and the number of tertiary amino groups present in the molecule. Quaternary ammonium compounds are particularly those with lower alkyl halides, e.g. methyl chloride, methyl bromide, methyl iodide, ethyl bromide or propyl chloride, lower alkyl lower alkane sulfonates, e.g. methyl or ethyl methane or ethane sulfonate, or lower alkyl hydroxy-lower alkane sulfonates, e.g. methyl 2-hydroxy-ethane sulfonate, or the corresponding hydroxides thereof, or the salts of the such hydroxides with acids other than hydrohalic or sulfonic acids, particularly those with organic carboxylic acids.

Compounds of this invention, which contain asymmetric carbon atoms, may exist in the form of mixtures of racemates, if more than one asymmetric carbon atom is present, or in the form of racemates, which, if desired, may be resolved into the optically active isomers, i.e. the antipodes.

The new compounds of this invention show antihistaminic effects of particularly long duration. They are intended to be used, for example, as antihistaminic agents to relieve allergic disorders caused by an excess of histamine, such as hay fever, urticaria, allergies caused by food or plant pollen, etc. An especially valuable group of compounds with respect to their antihistaminic activity are the 2-di-lower alkyl-amino-lower alkyl-3-monocyclic carbocyclic aryl-methyl-indenes, in which the di-lower alkyl-amino group is separated from the 2-position of the indene portion by at least two carbon atoms, which are part of a lower alkylene radical containing from two to three carbon atoms, and in which the aromatic portions of the monocyclic carbocyclic aryl radical and/or the indene nucleus are preferably unsubstituted or may contain one or several of the previously mentioned substituents, particularly methyl, methoxy, chlorine or bromine, and the therapeutically useful acid addition salts thereof. This group of compounds may be represented by 3-benzyl-2-(2-dimethylaminoethyl)-indene of the formula:

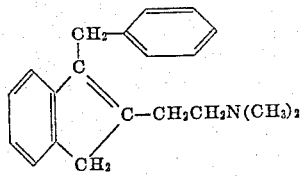

and the salts with hydrohalic acids, e.g. hydrochloric acid, with unsaturated dicarboxylic acids, e.g. maleic acid, or with hydroxy-substituted dicarboxylic acids, e.g. tartaric acid.

Another group of indene compounds which exerts valuable antihistaminic properties are the 2-di-lower alkyl-amino-lower alkyl-3-(1-monocyclic carbocyclic aryl-ethyl)-indenes, in which the di-lower alkyl-amino group is separated from the 2-position of the indene portion by at least two carbon atoms, which are part of a lower alkylene radical containing from two to three carbon atoms, and in which the aromatic portions of the monocyclic carbocyclic aryl radical and/or the indene nucleus are preferably unsubstituted or may contain one or several of the previously mentioned substituents, particularly methyl, methoxy, chlorine or bromine, and the therapeutically useful acid addition salts thereof. This group of compounds may be represented by 2-(2-dimethylaminoethyl)-(1-phenylethyl)-indene of the formula:

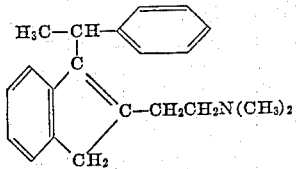

and the salts with hydrohalic acids, e.g. hydrochloric acid, with unsaturated dicarboxylic acids, e.g. maleic acid, or with hydroxy-substituted dicarboxylic acids, e.g. tartaric acid.

The new compounds of this invention may be used as medicaments in the form of pharmaceutical preparations, which contain the new indene derivatives, the salts or the quaternary ammonium compounds thereof in admixture with a pharmaceutical organic or inorganic, solid or liquid carrier suitable for enteral, e.g. oral, or parenteral administration. To relieve allergic skin troubles, they may also be employed topically. For making up the preparations there can be employed substances which do not react with the new compounds, such as water, gelatine, lactose, starches, stearic acid, magnesium stearate, stearyl alcohol, talc, vegetable oils, benzyl alcohols, gums, waxes, propylene glycol, polyalkylene glycols or any other known carrier for medicaments. The pharmaceutical preparations may be in the solid form, for example, as capsules, tablets or dragees, in liquid form, for example, as solutions, suspensions or emulsions, or in the form of salves or creams. If desired, they may contain auxiliary substances such as preserving agents, stabilizing agents, wetting or emulsifying agents, salts for varying the osmotic pressure or buffers, etc. They may also contain, in combination, other therapeutically useful substances.

The indene compounds of this invention may be prepared according to several procedures. Preferably, the 3-carbocyclic aryl-lower alkyl-2-tertiary amino-lower alkyl-indenes, in which carbocyclic aryl-lower alkyl and tertiary amino-lower alkyl have the above-given meanings, may be obtained by introducing the carbocyclic aryl-lower alkyl radical into a 2-tertiary amino-lower alkyl-indane or into a 2-tertiary amino-lower alkyl-indene compound, and, if desired, a resulting salt may be converted into the free compound and/or, if desired, a free compounds may be converted into a salt or a quaternary ammonium compound thereof, and/or, if desired, separating a resulting mixture of racemates into single racemates, and/or, if desired, resolving resulting racemates into antipodes.

For example, by reacting a 2-tertiary amino-lower alkyl-indan-1-one with a carbocyclic aryl-lower alkyl-Grignard reagent the desired 3-carbocyclic aryl-lower alkyl-2-tertiary amino-lower alkyl-indene may be obtained directly or after dehydration of an intermediarily formed indan-1-ol.

A carbocyclic aryl-lower alkyl-Grignard reagent is, for example, a carbocyclic aryl-lower alkyl-metal halide compound, in which the metal is selected from metal elements of the groups IIA and IIB of the periodic system which are capable of forming organo-metallic compounds. Magnesium is primarily used as the metal portion in these reactants; zinc or cadmium are less suitable. The halogen atom of such Grignard reagents may be chlorine, bromine or iodine. The reaction of the indan-1-one derivative with the carbocyclic aryl-lower alkyl-Grignard reagent may be carried out in the ether, e.g. diethyl ether, used for the preparation of the organo-metallic compound, or in another solvent, for example, in a different ether, such as carbocyclic aryl lower alkyl ether, e.g. anisole; di-carbocyclic aryl ether, e.g. diphenyl ether; or tetrahydrofurane or p-dioxane; or an organic base, e.g. N-ethylmorpholine or pyridine. Other solvents, which may also be added after formation of the Grignard reagent are hydrocarbons, such as aromatic hydrocarbons, e.g. benzene, toluene or xylene, or aliphatic hydrocarbons, e.g. pentane or hexane. A carbocyclic aryl-lower alkyl magnesium halide, e.g. chloride or bromide, is the preferred reagent, diethylether the preferred solvent. The reaction may be carried out under cooling, at room temperature, and may be completed by heating, for example, to the boiling point of the solvent. An inert gas, such as nitrogen, may be used to avoid any contact with atmospheric oxygen.

This type of reaction is suitable for the preparation of 3-carbocyclic aryl-lower alkyl-2-tertiary amino-lower alkylindenes, in which the lower alkylene radical, linking the carbocyclic aryl group with the 3-position of the indene nucleus, is an unbranched lower alkylene radical, for example, methylene or 1,2-ethylene, and the tertiary amino group is separated from the 2-position of the indene nucleus by at least two carbon atoms.

The Grignard reagents used in the above reaction may be formed according to known methods.

A second modification of the general procedure comprises reacting a 2-tertiary amino-lower alkyl-indan-1-one, in which the tertiary amino group is separated from the 2-position of the indane nucleus by at least two carbon atoms, with a carbocyclic aryl-lower alkyl lithium compound; and, if necessary, dehydrating any intermediarily formed indan-1-ol.

The reaction is carried out in the presence of a solvent; ethers, which are used for preparation of the aryl-lower alkyl lithium reagent, e.g. tetrahydrofuran or diethylether, or other inert solvents, such as, for example, aromatic hydrocarbons, e.g. benzene or toluene, are suitable. Preferably the indan-1-one compound is added to the freshly prepared carbocyclic aryl-lower alkyl lithium reagent, and during the addition the temperature is advantageously held below room temperature by cooling and is then allowed to rise to room temperature. If necessary, heat may be applied to complete the reaction, which may be carried out in the atmosphere of an inert gas, e.g. dry nitrogen. After completion of the reaction any excess of lithium or lithium compounds present in the reaction mixture is preferably removed.

This procedure is especially suitable for the preparation of 3-carbocyclic aryl-(R)methyl-2-tertiary amino-lower alkylindenes, in which R represents hydrogen or lower alkyl, e.g. methyl, and the tertiary amino group is separated from the 2-position of the indene nucleus by at least two carbon atoms.

The carbocyclic aryl-lower alkyl lithium reagents used in the above reaction may be prepared according to known procedures. For example, an ether formed by a carbocyclic aryl-(R)methanol, in which R represents hydrogen or lower alkyl, e.g. methyl, with a lower alkanol, a hydroxy-carbocyclic aryl compound or a carbocyclic aryl-lower alkanol, in an ether, particularly tetrahydrofuran, when treated with lithium at a temperature below 0° yields the desired carbocyclic aryl-(R)methyl lithium compound. A carbocyclic aryl-(R)methanol, in which R stands for hydrogen or lower alkyl, may be, for example, benzylalcohol or 1-phenyl-ethanol or these alcohols containing substituents in the aromatic portions as previously outlined; lower alkanols are, for example, methanol or ethanol, hydroxy-carbocyclic aryl compounds are, for example, phenol or substituted phenols, and carbocyclic aryl-lower alkanols are, for example, those mentioned hereinbefore as carbocyclic aryl-(R)methanols.

Specifically, when a bis-(α-R-benzyl)-ether, in which R represents lower alkyl, for example, methyl, e.g. bis-(α-methyl-benzyl)-ether, in tetrahydrofuran is reacted with an excess of lithium, the 1-phenylethyl lithium compound can be prepared, which is then treated with the 2-tertiary-amino-lower alkyl-indan-1-one, in which the tertiary amino group is separated from the 2-position of the indane nucleus by two to three carbon atoms.

The above reactions of indan-1-one compounds with carbocyclic aryl-lower alkyl metal or metal halide derivatives may furnish directly the desired 3-carbocyclic aryl-lower alkyl-2-tertiary amino-lower alkyl-indene compounds, because the intermediarily formed 1-carbocyclic aryl-lower alkyl-2-tertiary amino-lower alkyl-indan-1-ols may lose water under the conditions of the reaction to form the corresponding indene derivatives. The dehydration of the indan-1-ol compounds, if necessary, may also be achieved by treatment with an acid reagent, for example, an aqueous mineral acid, such as a hydrohalic acid, e.g. hydrochloric acid, or sulfuric acid, if desired, in the presence of glacial acetic acid, or with an acid halide, e.g. phosphorus oxychloride, if desired, in an organic base, e.g. pyridine, and, if necessary, with heating. This may be achieved without actually isolating the indan-1-ol compound.

The 2-tertiary amino-lower alkyl-indan-1-one compounds used as the starting materials in the above reactions are known or may be prepared according to the methods for manufacturing the known compounds. For example, an α-benzyl-malonic acid ester, such as a lower alkyl, e.g. ethyl, or a heterocyclic, e.g. tetrahydropyranyl, ester, in which the benzyl portion may be unsubstituted or substituted as outlined hereinabove, may be reacted in the presence of a base, such as an alkali metal lower alkanolate, e.g. sodium or potassium methylate, ethylate or t-butylate, with a reactive ester formed by a tertiary amino-lower alkanol and a strong inorganic or organic acid, such as a mineral acid, e.g. hydrochloric, hydrobromic, hydriodic or sulfuric acid, or an aryl-sulfonic acid, e.g. p-toluene sulfonic acid, or a salt thereof, to produce an α-benzyl-α-tertiary amino-lower alkyl-malonic acid ester. The latter may be cyclized prior or after hydrolysis and decarboxylation to the desired 2-tertiary armino-lower alkyl-indan-3-one. Hydrolysis may be carried out, for example, under alkaline conditions, such as with an aqueous alkali metal hydroxide, e.g. sodium or potassium hydroxide, and decarboxylation may occur, for example, by heating, if desired, in the presence of a mineral acid, e.g. hydrochloric or sulfuric acid. The cyclization to the indan-1-one compound may be achieved, for example, by treatment with a strong Lewis acid, such as a strong mineral acid, e.g. anhydrous hydrofluoric, sulfuric or phosphoric acid, the latter, for example, in the form of polyphosphoric acid, or boron trifluoride, for example, in the form of the etherate, or aluminum chloride.

1-carbocyclic aryl-lower alkyl-2-tertiary amino-lower alkyl-indan-1-ol compounds, in which carbocyclic aryl-lower alkyl and tertiary amino-lower alkyl have the above-given meaning, and in which the tertiary amino group is separated from the 2-position of the indane nucleus by at least two carbon atoms, and the salts thereof, may be formed as intermediates in the above reaction. They are new and are intended to be included within the scope of this invention.

As the previously described corresponding indene compounds, these indan-1-ol derivatives, their salts and quaternary ammonium compounds show antihistaminic properties and can be used to relieve allergic disorders caused by histamine, such as those previously outlined. An especially valuable group of compounds with respect to their antihistaminic effect, as well as to their use as intermediates for the preparation of highly active indenes are the 2-di-lower alkyl-amino-lower alkyl-1-monocyclic carbocyclic aryl-methyl-indan-1-ols, in which the di-lower alkyl-amino group is separated from the 2-position of the indane portion by at least two carbon atoms, which are part of a lower alkylene radical containing from two to three carbon atoms, and in which the aromatic portions of the monocyclic carbocyclic aryl radical and/or the indane nucleus are preferably unsubstituted or may contain one or several of the previously mentioned substituents, particularly methyl, methoxy, chlorine or bromine, and the therapeutically useful acid addition salts thereof. This group of compounds may be represented by 1-benzyl-2-(2-dimethylaminoethyl)-indane-1-ol of the formula:

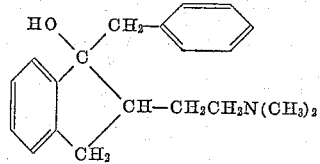

and the salts with hydrohalic acids, e.g. hydrochloric acid, with unsaturated dicarboxylic acids, e.g. maleic acid, or with hydroxy-substituted dicarboxylic acids, e.g. tartaric acid.

Another group of indan-1-ol compounds, which have valuable antihistaminic properties and which are of particular interest as intermediates for the preparation of the especially mentioned indene compounds, are the 2-di-lower alkyl-amino-lower alkyl-1-(1-monocyclic carbocyclic aryl-ethyl)-indan-1-ols, in which the di-lower alkyl-amino group is separated from the 2-position of the indane portion by at least two carbon atoms, which are part of a lower alkylene radical containing from two to three carbon atoms, and in which the aromatic portions of the monocyclic carbocyclic aryl radical and/or the indane nucleus are preferably unsubstituted or may contain one or several of the previously mentioned substituents, particularly methyl- methoxy, chlorine or bromine, and the therapeutically useful acid addition salts thereof. This group of compounds may be represented by 2-(2-dimethylaminoethyl)-1-(1-phenylethyl)-indan-1-ol of the formula:

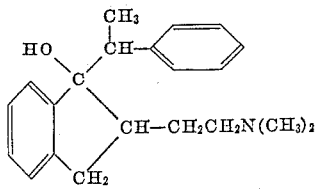

and the salts with hydrohalic acids, e.g. hydrochloric acid, with unsaturated dicarboxylic acids, e.g. maleic acid, or with hydroxy-substituted dicarboxylic acids, e.g. tartaric acid.

The 1-monocyclic carbocyclic aryl-lower alkyl-2-tertiary amino-lower alkyl-indan-1-ols, in which the tertiary amino group is separated from the indane nucleus by at least two carbon atoms, may be obtained as mixtures of the diastereoisomeric racemates, which mixtures may be separated and, if desired, resolved into the antipodes as shown hereinbelow. They may also be made up into pharmaceutical preparations, for example, according to the generally applicable methods previously described for the corresponding indene derivatives. As outlined hereinbefore, the the above indan-1-ols may furthermore be used as intermediates for the preparation of the corresponding indenes.

The compounds of this invention can be obtained in the form of the free bases or as the salts thereof. A salt may be converted into the free base, for example, by reaction with an alkaline reagent, such as an aqueous alkali metal hydroxide, e.g. lithium, sodium or potassium hydroxide; an aqueous alkali metal carbonate, e.g. sodium or potassium carbonate or hydrogen carbonate; or aqueous ammonia. A free base may be converted into its therapeutically useful acid addition salts by reaction with one of the inorganic or organic acids outlined hereinbefore, for example, by treating a solution of the base, for example, in a lower alkanol, e.g. methanol, ethanol, propanol or isopropanol, or in an equivalent solvent or solvent mixture with the acid or a solution thereof. The salts may also be obtained as the hemihydrates, monohydrates, sesquihydrates or polyhydrates depending on the conditions used in the formation of the salts; mono- or polysalts may be formed depending on the number of salt-forming groups and the conditions used for the formation of the salts.

The quaternary ammonium derivatives of the compounds of this invention may be obtained, for example, by reacting the tertiary base with an ester formed by a lower alkanol and a strong mineral or organic sulfonic acid. Such esters are specifically lower alkyl halides, e.g. methyl, ethyl, propyl or isopropyl chloride, bromide or iodides; or lower alkyl lower alkane sulfonates, e.g. methyl or ethyl methane, ethane or 2-hydroxy-ethane sulfonates. Suitable solvents are more especially lower alkanols, e.g. methanol, ethanol, propanol, isopropanol or butanol; lower alkanones, e.g. acetone or methyl ethyl ketone; or organic acid amides, e.g. formamide or dimethylformamide. If desired, the reaction may be carried out under cooling, at room temperature or at an elevated temperature and/or in a closed vessel under pressure or in the atmosphere of an inert gas, e.g. nitrogen.

Quaternary ammonium compounds obtained may be converted into the corresponding quaternary ammonium hydroxides, for example, by reacting a quaternary ammonium halide with silver oxide, or a quaternary ammonium sulfate with barium hydroxide, by treating a quaternary ammonium salt with an anion exchanger, or by electrodialysis. From a resulting quaternary ammonium hydroxide there may be prepared therapeutically suitable quaternary ammonium salts by reaction with acids, for example, with those outlined hereinbefore for the preparation of the acid addition salts. A quaternary ammonium compound may also be converted directly into another quaternary ammonium salt without the formation of the quaternary ammonium hydroxide; for example, a quarternary ammonium iodide may be reacted with freshly prepared silver chloride to yield the quaternary ammonium chloride, or a quaternary ammonium iodide may be converted into the corresponding chloride by treatment with hydrochloric acid in anhydrous methanol. Quaternary ammonium compounds may also crystallize as the hydrates.

The new compounds of this invention may be obtained as mixtures of diastereoisomeric compounds or salts thereof, which may be separated into the individual racemates or the salts thereof on the basis of physico-chemical differences, such as solubility, for example, by fractionated crystallization.

The racemates of the compounds of this invention may be resolved into the optically active d- and l-forms according to procedures known for the resolution of racemic compounds. For example, the free base of a racemic, d,l-compound may be dissolved in a solvent, such as in a lower alkanol, e.g. methanol or ethanol, and one of the optically active forms of an acid containing an asymmetric carbon atom, or a solution thereof, for example, in the same alkanol or in water or in a mixture of such solvents, is then added, whereupon a salt may be isolated, which is formed by one of the optically active acids with an optically active form of the base. Especially useful as optically active forms of salt-forming acids having an asymmetric carbon atom are D- and L-tartaric acid; the optically active forms of malic, mandelic, camphor sulfonic or quinic acid may also be employed. From a resulting salt, the free and optically active base may be obtained according to processes known for the conversion of a salt into a base, for example, as outlined hereinbefore. An optically active base may be converted into a therapeutically useful acid addition salt with one of the acids mentioned hereinbefore, or into a quaternary ammonium compound as previously shown. The optically active forms may also be isolated by biochemical methods.

The invention also comprises any modification of the process wherein a compound obtainable as an intermediate at any stage of the process is used as starting material and the remaining step(s) of the process is(are) carried out, as well as any new intermediates.

In the process of this invention such starting materials are preferably used which lead to final products mentioned in the beginning as preferred embodiments of the invention.

This is a continuation-in-part application of my application Serial No. 792,714, filed February 12, 1959 (now abandoned) which in turn is a continuation-in-part application of my application Serial No. 785,314, filed January 7, 1959 (now abandoned), which in turn is a continuation-in-part application of my application Serial No. 744,328, filed June 25, 1958 (now abandoned), which in turn is a continuation-in-part of my application Serial No. 722,641, filed March 20, 1958 (now abandoned).

The following examples are intended to illustrate the invention and are not to be construed as being limitations thereon. Temperatures are given in degrees centigrade.

*Example 1*

A solution of 3.5 g. of 2-(2-dimethylaminoethyl)-indan-1-one in 50 ml. of dry anisole is added with stirring to the solution of a Grignard reagent, formed from 1.7 g. of magnesium and 8 ml. of benzyl chloride in 50 ml. of ether held at 15°. After the addition is completed, the mixture is refluxed on the steam bath with the condenser water turned off to allow removal of the ether; heating is continued for an additional six hours. The mixture is then decomposed with a saturated aqueous solution of ammonium chloride. The separated anisole phase, containing the 1-benzyl-2-(2-dimethylaminoethyl)-indan-1-ol, is extracted with 100 ml. of 1 N aqueous hydrochloric acid, the acid layer is made basic with aqueous ammonia and extracted with ether. After drying the ether solution over sodium sulfate and evaporating the solvent, the residue is dissolved in a small amount of ethanol, acidified with 6 N ethanolic hydrogen chloride, and after the addition of ether, the hydrochloride of 3-benzyl-2-(2-dimethylaminoethyl)-indene crystallizes and is recrystallized from ethanol, M.P. 171–172°. The corresponding picrate, obtained by treating the ethanol solution of the base, obtained by treatment of the hydrochloride with aqueous ammonia and subsequent ether extraction, with picric acid, melts at 165°.

The intermediarily formed 1-benzyl-3-(2-dimethylaminoethyl)-indan-1-ol may be isolated by proceeding as follows: The ether of the Grignard mixture, resulting from the reaction of 2-(2-dimethylaminoethyl)-indane-1-one with 5-molar equivalents of benzyl magnesium chloride in ether, is removed by distillation, and the somewhat viscous residue is heated overnight on the steam bath. After dilution with ether and decomposition with aqueous ammonium chloride, the ether extract is separated, dried and evaporated to dryness. The resulting syrup crystallizes to yield the 1-benzyl-2-(2-dimethylaminoethyl)-indan-1-ol, which is recrystallized from ether, M.P. 85°.

The starting material used in the above reaction may be prepared as follows: 33.2 g. of dihydropyran is slowly added to a stirred solution of 50 g. of α-benzyl-malonic acid and 0.1 g. of p-toluene sulfonic acid, in 130 ml. of diethylether, which solution is kept at 30° during the addition of the dihydropyran. The mixture is stirred for an additional 15 minutes, then poured on ice, and the ether phase is extracted with aqueous potassium carbonate. After washing with water and drying over magnesium sulfate, the ether is evaporated under reduced pressure by maintaining a temperature of below 30° to yield the di-tetrahydropyranyl α-benzyl-malonate. A toluene solution of this ester is gradually added to a 50% toluene solution of 4.86 g. of sodium hydride while heating and stirring for six hours. A solution of 10.8 g. of 2-dimethylaminoethyl chloride in toluene is added dropwise, and the reaction mixture is refluxed for an additional 48 hours. The toluene layer is washed with water, dried over magnesium sulfate and evaporated to yield the di-tetrahydropyranyl α-benzyl-α-(2-dimethylaminoethyl)-malonate; yield: 32.2 g. of crude material.

A stirred mixture of the resulting di-tetrahydropyranyl α-benzyl-α-(2-dimethylaminoethyl)-malonate in 180 g. of polyphosphoric acid is treated at 110–120° during thirty minutes, and then at 150° during twenty additional minutes. The reaction mixture is cooled, poured into icewater, the acidic phase is neutralized with potassium carbonate and then extracted with ether. The ether solution is washed with 15 percent aqueous hydrochloric acid, the aqueous layer is neutralized with potassium carbonate and again extracted with ether. After washing with water and drying over magnesium sulfate, the ether is evaporated to yield the 2-(2-dimethylaminoethyl)-indan-1-one; yield: 8 g. of crude material. The hydrochloride of the base melts at 175° after recrystallization from a mixture of ethanol and ether.

Example 2

1 g. of 3-benzyl-2-(2-dimethylaminoethyl)-indene is dissolved in 10 ml. of acetone. 2 ml. of methyl iodide is added and the solution is allowed to stand overnight at room temperature. The crystalline 3-benzyl-2-(2-dimethylaminoethyl)-indene methiodide separates and is recrystallized from water, M.P. 215–216°.

Example 3

To a solution of a Grignard reagent, prepared by reacting 8 g. of 4-chlorobenzyl chloride with 1.2 g. of magnesium in 75 ml. of ether, is added a solution of 2 g. of 2-(2-dimethylaminoethyl)-indan-1-one in 20 ml. of ether. After refluxing for 3 hours, the mixture is cooled and decomposed with aqueous ammonium chloride. The organic material is extracted with ether and, after the removal of the ether, the 1-(4-chlorobenzyl)-2-(2-dimethylaminoethyl)-indan-1-ol crystallizes and is recrystallized from ethanol, M.P. 136°. The hydrochloride of this base may be prepared by treating an ethanol solution of the base with ethanolic hydrogen chloride and adding ether to turbidity; the hydrochloride crystallizes therefrom.

2 g. of 1-(4-chlorobenzyl)-2-(2-dimethylaminoethyl)-indan-1-ol is refluxed with 5 ml. of concentrated hydrochloric acid and 20 ml. of acetic acid for ½ hour. The solvents are evaporated under reduced pressure, water is added to the residue and, after treatment with aqueous ammonia, the organic base is extracted with ether. After drying and evaporating the ether, the residue is taken up in a few milliliters of ethanol and treated with ethanolic hydrogen chloride. Upon addition of ether to turbidity, the 3-(4-chlorobenzyl)-2-(2-dimethylaminoethyl)-indene hydrochloride crystallizes and is recrystallized from a mixture of ethanol and ether, M.P. 205–206°.

Example 4

A solution of 7.5 g. of 2-(2-diethylaminoethyl)-indan-1-one in 75 ml. of anisole is added while stirring to a cold solution of 5 molar equivalents of benzyl magnesium chloride in ether. Excess ether is distilled off on the steam bath and the reaction mixture is heated for five hours. The unreacted Grignard reagent is decomposed by adding a saturated aqueous solution of ammonium chloride while cooling. The ether solution is extracted with aqueous hydrochloric acid, the acid layer is made basic with aqueous ammonia and the organic material is extracted with ether. After washing and drying the solution and evaporating the ether, 8 g. of crude basic material is recovered, which is refluxed for 30 minutes with 16 ml. of concentrated hydrochloric acid and 64 ml. of glacial acetic acid. The reaction mixture is concentrated under reduced pressure, the residue diluted with water and the aqueous solution made basic with aqueous ammonia. The organic material is again extracted with ether, the ether solution washed and dried, and the ether evaporated under reduced pressure. 5.7 g. of the crude basic material is dissolved in 25 ml. of benzene and placed on a column containing 70 g. of aluminum oxide (basic activity No. 1). 2 g. of basic material is eluted with benzene and is converted to the 3-benzyl-2-(2-diethylaminoethyl)-indene hydrochloride according to the procedure described in Example 1; the recrystallized hydrochloride melts at 134–136°; yield: 0.7 g.

The starting material used in the above reaction may be prepared as follows: To a warm suspension of 22 g. of sodium hydride in 1,000 ml. of toluene is added dropwise while stirring 100 g. of diethyl α-benzyl-malonate. The reaction mixture is refluxed for one hour after completion of the addition, then a solution of 70 g. of 2-diethylaminoethyl chloride in toluene is added and the reaction mixture is refluxed overnight. The toluene solution is extracted with aqueous hydrochloric acid, the acidic layer is made basic with aqueous ammonia and the organic material is extracted with ether. The ether solution is washed, dried and evaporated under reduced pressure to yield 136 g. of diethyl α-benzyl-α-(2-diethylaminoethyl)-malonate, the oxalate of which melts at 117–119°.

A mixture of 136 g. of diethyl α-benzyl-α-(2-diethylaminoethyl)-malonate, 65.5 g. of potassium hydroxide, 85 ml. of water and 340 ml. of ethanol is refluxed for 4 hours, then concentrated under reduced pressure. The solid residue is dissolved in a minimum amount of water, the aqueous solution is neutralized with acetic acid while externally cooling and the resulting α-benzyl-α-(2-diethylaminoethyl)-malonic acid is filtered off and washed with ice water and ethanol. After drying under reduced pressure, it melts at 128°; yield: 103 g.

103 g. of α-benzyl-α-(2-diethylaminoethyl)-malonic acid is heated to 180° with occasional stirring until foaming ceases; the decarboxylation is complete after approximately 15 minutes. The resulting melt is cooled and diluted with about 15 ml. of ethanol, ether is added and the 2-benzyl-4-diethylamino-butyric acid crystallizes, M.P. 102–104°; yield: 83 g.

83 g. of 2-benzyl-4-diethylamino-butyric acid is added to 415 g. of polyphosphoric acid kept at 100–120°. The temperature is then raised to 140–145° for about 20 minutes and the acid is decomposed by pouring the reaction mixture into ice water and neutralizing the aqueous solution with potassium carbonate. The 2-(2-diethylaminoethyl)-indan-1-one is extracted with ether, the ether solution is washed and dried and the ether is evaporated. The hydrochloride salt, prepared according to the previously given procedure, melts at 164–166°; yield: 12.3 g.

*Example 5*

To a Grignard reagent prepared by treating 10 ml. of benzyl chloride with 1.95 g. of magnesium in 100 ml. of ether is added a solution of 4 g. of 6-chloro-2-(2-dimethylaminoethyl)-indan-1-one in 50 ml. of ether. The solution is refluxed for 24 hours and then decomposed with a saturated aqueous ammonium chloride solution while cooling. The basic material is isolated as described in the previous examples and refluxed with 10 ml. of concentrated hydrochloric acid and 40 ml. of acetic acid to dehydrate any 1-benzyl-6-chloro-2-(2-dimethylaminoethyl)-indan-1-ol present in the reaction product. The solvents are distilled off under reduced pressure, the residue is taken up in water, treated with aqueous ammonia and extracted with ether. The residue obtained after the removal of the ether is dissolved in benzene and chromatographed on 100 g. of basic aluminum oxide. The column is developed with benzene, followed by a 95:5-mixture of benzene and anhydrous ether. After evaporating the solvents, these eluates yield a syrupy base which is converted to the 3-benzyl-5-chloro-2-(2-dimethylaminoethyl)-indene hydrochloride according to the previously given method. The salt is recrystallized from a mixture of ethanol and ether, M.P. 190–192°.

The starting material used in the above reaction may be prepared as follows: 70 g. of diethyl α-(4-chlorobenzyl)-malonate, B.P. 150–151°/0.5 mm., obtained by reacting 4-chlorobenzyl chloride with sodium diethyl malonate, is added to a stirred suspension of 8 g. of sodium hydride in 500 ml. of refluxing toluene. After 2 hours, 34 g. of 2-dimethylaminoethyl chloride is added dropwise and the mixture is refluxed for an additional 12 hours, then cooled and extracted with an excess of hydrochloric acid. The acidic extract is treated with aqueous ammonia and diethyl α-(4-chlorobenzyl)-α-(2-dimethylaminoethyl)-malonate is separated in a separatory funnel. It is characterized as the crystalline exalate which melts at 175–178° after recrystallization from a mixture of ethanol and ether.

The diethyl α-(4-chlorobenzyl)-α-(2-dimethylaminoethyl)-malonate is hydrolyzed with potassium hydroxide as described in Example 4, the resulting α-(4-chlorobenzyl)-α-(2-dimethylaminoethyl)-malonic acid melts at 180–181° after recrystallizing from water. The 2-(4-chlorobenzyl)-4-dimethylamino-butyric acid is obtained by decarboxylating the malonic acid derivative at a temperature of 185° for 5 minutes, and is obtained in crystalline form from ether. It is cyclized as described in Example 4 by treatment with polyphosphoric acid to yield the desired 6-chloro-2-(2-dimethylaminoethyl)-indan-1-one which is converted to its hydrochloride, 175–176°.

*Example 6*

A solution of 3 g. of 2-(2-dimethylaminoethyl)-6-methoxy-indan-1-one in 50 ml. of anisole is added to 50 ml. of an ether solution of 1.1 molar equivalent of benzyl magnesium chloride prepared in the usual way. The mixture is heated on the steam bath, the ether is evaporated and heating on the steam bath is continued for 12 hours. The reaction mixture is decomposed with an aqueous solution of ammonium chloride and worked up according to the procedure described in Example 1. The 3-benzyl-2-(2-dimethylaminoethyl)-5-methoxy-indene hydrochloride melts after two recrystallizations from methanol at 185°.

The starting material used in the above reaction may be prepared as follows: To a solution of 16.25 g. of sodium in 288 ml. of ethanol is slowly added 113.5 g. of diethyl malonate at 50°. The clear reaction solution is treated dropwise with 110.7 g. of 4-methoxybenzyl chloride and the reaction mixture is refluxed for one hour. After filtration and evaporation of the solvent, the residue is diluted with water and the oily product is extracted with ether, the ether solution washed and dried, and the solvent evaporated. The diethyl α-(4-methoxybenzyl)-malonate is distilled, B.P. 155–165°/0.75 mm.; yield: 66.7 g.

To a refluxing suspension of 6.1 g. of sodium hydride in 550 ml. of toluene is added dropwise while stirring 66.7 g. of diethyl α-(4-methoxybenzyl)-malonate and the reaction mixture is refluxed for one hour. A solution of 31 g. of 2-dimethylaminoethyl chloride in toluene is added, the reaction mixture heated overnight and the toluene solution then extracted with aqueous hydrochloric acid. The acidic layer is made basic with aqueous ammonia, the organic material is extracted with ether, the ether solution is washed and dried and the solvent evaporated. 77 g. of diethyl α-(4-methoxybenzyl)-α-(2-dimethylaminoethyl)-malonate is obtained and characterized as the hydrochloride salt, 145–147°.

A mixture of 73.4 g. of diethyl α-(4-methoxybenzyl)-α-(2-dimethylaminoethyl)-malonate, 26.8 g. of potassium hydroxide, 30 ml. of water and 148 ml. of ethanol is refluxed for 4 hours and then concentrated under reduced pressure. The solid residue is dissolved in a minimum amount of water and neutralized with acetic acid under external cooling. The resulting α-(4-methoxybenzyl)-α-(2-dimethylaminoethyl)-malonic acid is filtered off, washed with ice water and ethanol and dried under reduced pressure, M.P. 163–165°; yield: 45.5 g.

45.5 g. of α-(4-methoxybenzyl)-α-(2-dimethylaminoethyl)-malonic acid is heated to 180° with occasional stirring until foaming ceases after completion of decarboxylation. The resulting melt is diluted with about 10 ml. of ethanol, ether is added, and the 2-(4-methoxybenzyl)-4-dimethylamino-butyric acid crystallizes, M.P. 87°; yield: 33.7 g.

33.7 g. of 2-(4-methoxybenzyl)-4-dimethylamino-butyric acid is gradually added to 168 g. of polyphosphoric acid kept at 90–120°, and the reaction mixture is heated to 140–150° for 20 minutes. It is then poured into ice water, neutralized with potassium carbonate, and, since no crystalline product is formed, is made strongly basic with 3 N aqueous sodium hydroxide. The organic material is extracted with ether, the ether solution washed and dried and the solvent then avoporated. The resulting 2-(2-dimethylaminoethyl)-6-methoxy-indan-1-one is converted to the hydrochloride, M.P. 225–227°; yield: 14.5 g.

*Example 7*

By reacting an anisole solution of 4-methoxybenzyl magnesium chloride, prepared by treating an ether solution of 4-methoxybenzyl chloride with magnesium, with 2-(2-dimethylaminoethyl)-indan-1-one according to the procedure given in Example 1, the 2-(2-dimethylaminoethyl)-3-(4-methoxybenxyl)-indene may be obtained after treatment with an acid to dehydrate any 2-(2-dimethylaminoethyl) - 1 - (4 - methoxybenzyl) - indan- 1-ol present in the reaction product; the product is characterized as the hydrochloride salt.

Example 8

A solution of 6 g. of 2-(3-dimethylaminopropyl)-indan-1-one in 50 ml. of ether is added dropwise with cooling to 100 ml. of an ether solution of a one molar equivalent of benzyl magnesium chloride. The condenser water is turned off and most of the ether is removed to leave about 20 ml. of a somewhat viscous reaction mixture, which is heated for an additional 6 hours on the steam bath. After diluting with ether it is decomposed with aqueous ammonium chloride and the crude base is worked up as previously described. After refluxing with 15 ml. of concentrated hydrochloric acid and 60 ml. of glacial acetic acid for 30 minutes and removing the solvents by distillation under reduced pressure, the basic fraction is isolated in the usual way. It is dissolved in a small amount of benzene and chromatographed on basic aluminum oxide. The eluates obtained with benzene and with a 95:5-mixture of benzene and anhydrous ether are evaporated to dryness and the resulting 3-benzyl-2-(3-dimethylaminopropyl)-indene is converted to the oxalate, M.P. 145–150°.

The 2-(3-dimethylaminopropyl)indan-1-one, the hydrochloride of which melts at 118–120°, and which is used as the starting material in the above reaction, may be prepared according to the procedure outlined in one of the previous examples. The intermediate α-benzyl-α-(3-dimethylaminopropyl)-malonic acid melts at 204–205° (after recrystallization from water), and the 2-benzyl-5-dimethylamino-valeric acid at 110° (after recrystallization from a mixture of ethanol and ether).

Example 9

Upon reaction of 4-chlorobenzyl magnesium chloride with 2-[2-piperidino-(N)-ethyl]-indan-1-one according to the procedure given in Example 1, the 3-(4-chlorobenzyl)-2-[2-piperidino-(N)-ethyl]-indene may be prepared which is characterized as the hydrochloride salt.

The starting material may be prepared by treating the sodium salt of diethyl α-benzyl-malonate with 2-piperidino-(N)-ethyl chloride, hydrolyzing the ester to the free acid and decarboxylating the latter to the 2-benzyl-4-piperidino-(N)-butyric acid, which is cyclized to the 2-[2-piperidino-(N)-ethyl]-indan-1-one according to the procedure outlined in the previous examples.

Example 10

The reaction of 2-(2-dimethylaminoethyl)-indan-1-one with 3-methylbenzyl magnesium chloride according to the procedure described in Example 1 yields the 2-(2-dimethylaminoethyl) - 3 - (3 - methylbenzyl) - indene, which may be characterized as the hydrochloride salt.

Example 11

A solution of 3 g. of 2-(2-dimethylaminoethyl)-indan-1-one in 25 ml. of ether is added to 50 ml. of a 1 molar solution of benzyl magnesium chloride in ether. The ether is removed by heating on the steam bath with the condenser water turned off to reduce the volume of the reaction mixture to about 10 milliliters. Heating on the steam bath is then continued for an additional 6 hours. The mixture is diluted with ether, the organometallic compounds are decomposed with aqueous ammonium chloride and the crude basic portion is dissolved in 5 ml. of ether and chilled. The crystalline precipitate is collected and recrystallized from ethanol to yield the 1-benzyl-2-(2-dimethylaminoethyl)-indan-1-ol, M.P. 85°. By reacting the latter with a mixture of hydrochloric acid and glacial acetic acid, the 1-benzyl-2-(2-dimethylaminoethyl)-indene is obtained; it is identical with the product obtained according to the process of Example 1.

Example 12

To a Grignard reagent prepared by treating 77 ml. of benzyl chloride with 14.6 g. of magnesium in 390 ml. of ether, is added a solution of 27.3 g. of a mixture of 2 - (2 - dimethylamino - 1 - methyl - ethyl) - indan - 1-one and 2-(2-dimethylamino-2-methyl-ethyl)-indan-1-one in 150 ml. of anisole. The excess ether is distilled off and the reaction mixture is heated for 5 hours on the steam bath, then decomposed with a saturated aqueous ammonium chloride solution while cooling. The basic material is isolated as previously described and refluxed for ½ hour with 44 ml. of concentrated hydrochloric acid and 1.76 ml. of glacial acetic acid. The solvents are distilled off, the residue is diluted with water, made basic with ammonia and extracted with ether. The ether is removed under reduced pressure and the residue is dissolved in benzene and chromatographed on 175 g. of aluminum oxide. The eluate with benzene is rechromatographed and eluted with a 50:50-mixture of cyclohexane and benzene. After evaporation, the viscous, non-crystalline mixture of 3-benzyl-2-(2-dimethylamino-1-methyl-ethyl)-indene and 3-benzyl-2-(2-dimethylamino-2-methyl-ethyl)-indene is obtained; yield: 2.9 g. The methiodide of the mixture melts at 211–214°.

The starting material used in the above reaction may be prepared as follows: To a warm suspension of 22 g. of sodium hydride in 1,000 ml. of toluene is added dropwise while stirring 100 g. of diethyl α-benzyl-malonate. The reaction mixture is refluxed for one additional hour, then a toluene solution of 65 g. of dimethylaminoisopropyl chloride is added and the reaction mixture refluxed overnight. The benzene solution is extracted with aqueous hydrochloric acid, the acidic layer made basic with ammonia and the organic material extracted with ether. The ether solution is washed and dried, and the ether evaporated under reduced pressure to yield 118 g. of the crude mixture of diethyl α-benzyl-α-(2-dimethylamino-1-methyl-ethyl)-malonate and diethyl α-benzyl-α-(2-dimethylamino-2-methyl-ethyl)-malonate.

118 g. of this mixture is added dropwise while stirring to 828 g. of polyphosphoric acid at 100–120°. The reaction mixture is then heated at 140–145° for 40 minutes. The mixture is poured into ice water and the aqueous solution neutralized with potassium carbonate. The organic material is extracted with ether, the ether solution washed and dried, and the ether evaporated. The resulting mixture of 2-carbethoxy-2-(2 - dimethylamino-1-methyl-ethyl)-indan-1-one and 2-carbethoxy-2-(2-dimethylamino-2-methyl-ethyl)-indan-1-one is distilled, B.P. 135–150°/0.65 mm.; yield: 38 g.

A solution of 38 g. of this mixture in 350 ml. of 2 N hydrochloric acid is refluxed for 4 hours, then made strongly basic with ammonia and the organic material extracted with ether. After evaporation 27.3 g. of the mixture of 2-(2-dimethylamino-1-methyl-ethyl)-indan-1-one and 2-(2-dimethylamino-2-methyl-ethyl)-indan-1-one is obtained and is used without further purification.

Example 13

A solution of 15 g. of 2-[2-(1-pyrrolidino)-ethyl]-indan-1-one in 50 ml. of toluene is added to the Grignard reagent prepared from 42 g. of benzyl chloride and 8 g. of magnesium in 200 ml. of ether. The mixture is allowed to stand for 7 days at 25° and is then decomposed with an excess of concentrated aqueous ammonium chloride. The ether solution is separated and extracted with 100 ml. of a 20% aqueous hydrochloric acid. The acid solution is heated for one hour on the steam bath to dehydrate the intermediarily formed 1-benzyl-2-[2-(1-pyrrolidino)-ethyl]-indan-1-ol. The acid solution is made basic with ammonia, extracted with ether, the ether solution is evaporated and the residue is distilled. The 3-benzyl-2-[2-(1-pyrrolidino)-ethyl]-indene boils at 160°/0.2 mm. and is converted to the hydrochloride, which melts after recrystallization from ethanol at 198–200°.

The starting material may be prepared as follows: To a cooled solution of the sodium diethyl α-benzyl-malonate, prepared from 75 g. of diethyl α-benzyl-malonate and 16 g. of a 1:1-mixture of sodium hydride and mineral oil, in 150 ml. of toluene is added a toluene solution of 2-(1-pyrrolidino)-ethyl chloride. This solution is prepared by shaking 61 g. of 2-pyrrolidino-(N)-ethyl chloride hydrochloride in 200 ml. of toluene with 50 ml. of water containing 23 g. of sodium hydroxide, drying the organic solution over potassium hydroxide pellets and using it without further purification. The reaction mixture is heated at 120° for 6 hours while stirring. The organic solvent is then evaporated under reduced pressure and the residue is refluxed for 7 hours with a solution of 40 g. of sodium hydroxide in 200 ml. of water and 300 ml of ethanol. The mixture is acidified with concentrated aqueous hydrochloric acid and evaporated to dryness under reduced pressure. The remaining residue is heated in an oil bath with the temperature slowly raising to 180° over about one hour; the decarboxylation is complete after 30 minutes heating at this temperature. The mixture is digested with 250 ml. of hot ethanol, the hot solution is filtered and the solvent is evaporated to dryness to give the crystalline 2-benzyl-4-(1-pyyrolidino)-butyric acid hydrochloride, M.P. 178–182°.

The resulting acid hydrochloride is added in small quantities while stirring to 400 g. of polyphosphoric acid kept at 100°. The temperature is then raised to 120° and held for 30 minutes; the mixture is then poured onto ice, made alkaline and extracted with ether. After the removal of the organic solvent, the 2-[2-(1-pyrolidino)-ethyl]-indan-1-one is distilled at 148–152°/0.4 mm.

*Example 14*

A solution of 10 g. of 2-[2-(4-methyl-1-piperazino)-ethyl]-indan-1-one in 50 ml. of toluene is added to a Grignard reagent prepared from 25 g. of benzyl chloride and 4.8 g. of magnesium in 150 ml. of ether. After standing for 7 days at 25°, the mixture is worked up as shown in Example 13; the intermediate 1-benzyl-2-[2-(4-methyl-1-piperazino)-ethyl]-indan-1-ol is dehydrated with acid and the resulting 3-benzyl-2-[2-(4-methyl-1-piperazino)-ethyl]-indene is distilled, B.P. 180°/0.3 mm. and converted to the crystalline dihydrochloride, which melts at 245–250° after recrystallization from ethanol.

The starting material may be prepared according to the procedure given in Example 13 by using the same quantities of starting material. The intermediate 2-benzyl-4-(4-methyl-1-piperazino)-butyric acid hydrochloride melts at 195–200° and is cyclized to the 2-[2-(4-methyl-1-piperazino)-ethyl]-indan-1-one, B.P. 168–170°/0.4 mm.

*Example 15*

A solution of 15 g. of 2-(2-dimethylamino-2-methyl-ethyl)-indan-1-one hydrochloride in water is basified with aqueous ammonia and extracted with ether. The organic solution is dried over sodium sulfate, concentrated to dryness under reduced pressure, and the residue is dissolved in 50 ml. of ether. This solution is added to the Grignard reagent prepared from 45 g. of benzyl chloride and 8.6 g. of magnesium in 200 ml. of ether. The reaction mixture is allowed to stand at room temperature for 3 weeks, it is then concentrated to about one fourth of the original volume and the remainder refluxed for an additional 48 hours. The reaction mixture is diluted with 100 ml. of ether, decomposed with a large excess of ammonium chloride and extracted with an excess of aqueous hydrochloric acid. The acid solution, containing the 1-benzyl-2-(2-dimethylamino-2-methyl-ethyl)-indan-1-ol, is heated for one hour on the steam bath, made basic and extracted with ether. The organic solvent is removed and the remaining residue is distilled, B.P. 160°/0.4 mm. This fraction is converted to the hydrochloride by bubbling hydrogen chloride into an ether solution thereof. The solvent is decanted to leave the syrupy 3-benzyl-2-(2-dimethylamino-2-methyl-ethyl)-indene hydrochloride.

The corresponding maleate is prepared by adding a solution of 0.4 g. of maleic acid in 2 ml. of hot ethanol to a solution of 1 g. of 3-benzyl-2-(2-dimethylamino-2-methyl-ethyl)-indene in 2 ml. of hot ethanol. After cooling the crystalline maleate salt is collected and melts at 120–121° after recrystallization from ethanol.

By treating the free base in acetone with methyl iodide the 3-benzyl-2-(2-dimethylamino-2-methyl-ethyl)-indene methiodide can be prepared and melts at 185° (with decomposition) after recrystallization from ethanol.

The starting material in the above reaction may be prepared as follows: To a suspension of 66 g. of sodium hydride (1:1-mixture with mineral oil) in 2,000 ml. of toluene, heated to about 100°, is added dropwise 300 g. of diethyl α-benzyl-malonate while stirring. The mixture is refluxed for one hour and a toluene solution of di-methylaminoisopropyl chloride (prepared from 310 g. of the corresponding hydrochloride) is added slowly. Refluxing is continued overnight, and the reaction mixture is then extracted with 15% aqueous hydrochloric acid, the acidic extract is made basic with aqueous ammonia and extracted with ether. The ether solution is washed, dried and evaporated to yield 396 g. of the desired diethyl α-(2-dimethylamino-2-methyl-ethyl)-α-benzyl-malonate.

50 g. of this ester is added to 350 g. of polyphosphoric acid and the mixture is heated to 150–160° for 30 minutes while stirring. After cooling, it is poured onto ice, neutralized with potassium carbonate, and the organic material is extracted with ether, which solution is washed, dried and evaporated. 31 g. of the residue is refluxed for 4 hours with 300 ml. of 2 N aqueous hydrochloric acid, which solution is then made basic with aqueous ammonia and extracted with ether. The organic material remaining after the evaporation of the ether is distilled, B.P. 112–114°/0.23 mm. and this fraction converted to the desired 2-(2-dimethylamino-2-methyl-ethyl)-indan-1-one hydrochloride, which melts at 194–196° after recrystallization from a mixture of ethanol and ether.

*Example 16*

A solution of 5.5 g. of 2-(2-dimethylaminoethyl)-indan-1-one in 25 ml. of ether is added to a Grignard reagent prepared from 26.7 g. of 2-phenylethyl chloride and 4.55 g. of magnesium in 170 ml. of ether. The reaction mixture is allowed to stand for two weeks at 5°; the larger part of the ether is then removed by distillation and the somewhat viscous residue is refluxed for several hours. The mixture is diluted with 100 ml. of ether and decomposed with aqueous ammonium chloride. The separated ether solution is evaporated to leave the oily 2-(2-dimethylaminoethyl)-1-(2-phenylethyl)-indan-1-ol, which is dehydrated by refluxing for 30 minutes with 51 ml. of acetic acid and 17 ml. of concentrated aqueous hydrochloric acid. The acids are then removed by distillation under reduced pressure, the residue is diluted with water, basified and extracted with ether. The ether extract is evaporated to dryness, a few milliliters of benzene are added to the residue, which is chromatographed on 100 g. of aluminum oxide. The fraction eluted with a 95:5-mixture of benzene and anhydrous ether yields the 2-(2-dimethylaminoethyl)-3-(2-phenylethyl)-indene, which is converted to the hydrochloride, melting at 196–198° after recrystallization from ethanol.

The corresponding methiodide is recrystallized from a mixture of ethanol and ethyl acetate and melts at 176° (with decomposition).

*Example 17*

An ether solution of 15 g. of 2-(2-dimethylaminoethyl)-3-methyl-indan-1-one is heated dropwise while stirring to a 5 molar excess of benzyl magnesium chloride (prepared from 45 ml. of benzyl chloride and 8.5 g. of magnesium in a total of 230 ml. of ether). The reaction mixture is allowed to stand for 8 days while cooling; the excess Grignard reagent is then decomposed by the addition of aqueous ammonium chloride. The separated ether layer is extracted with a solution of 23 ml. of concentrated aqueous hydrochloric acid in 50 ml. of water, the acidic extract, containing the 1-benzyl-2-(2-dimethylaminoethyl)-3-methyl-indan-1-ol, is refluxed for one hour to complete the dehydration. After basifying with ammonia, it is extracted with ether, the organic extract is washed, dried and evaporated. The residue is distilled to give 3-benzyl-2-(2-dimethylaminoethyl)-1-methyl-indene, B.P. 170–174°/0.75 mm. The corresponding oxalate melts at 200° (with decomposition), the methiodide at 137–139°.

The starting material used in the above reaction may be prepared as follows: To a solution of 12.3 g. of sodium in 200 ml. of ethanol kept at 50° is slowly added 81 ml. of diethyl malonate, followed by dropwise addition of 100 g. of 1-phenylethyl bromide. The reaction mixture is refluxed for about one hour, the resulting sodium chloride is filtered off and the solvent is evaporated. The residue is distilled to give 83 g. of diethyl α-(1-phenylethyl)-malonate, B.P. 165–170°/18 mm.

The diethyl α-(1-phenylethyl)-malonate is slowly added to a heated suspension of 17.5 g. of sodium hydride (1:1-mixture in mineral oil) in 750 ml. of toluene; the reaction mixture is refluxed for one hour and a toluene solution of 55 g. of 2-dimethylaminoethyl chloride is added. The reaction mixture is refluxed overnight and then extracted with 15% aqueous hydrochloric acid; the acid solution is made basic with ammonia and extracted with ether. The ether is removed to yield 93 g. of the desired diethyl α-(2-dimethylaminoethyl)-α-(1 - phenylethyl) - malonate, the oxalate of which melts at 136–138°.

This ester is hydrolyzed by refluxing with 27.7 g. of sodium hydroxide in 45.5 ml. of water and 186 ml. of ethanol for 8 hours. After evaporation of the organic solvent, a minimum amount of water is added to complete solution whereupon the hydrochloride is formed by the addition of concentrated aqueous hydrochloric acid. The water is evaporated under reduced pressure and the residue is treated with boiling ethanol to extract the hydrochloride salt. The separated organic solution is evaporated and the residue is decarboxylated by heating at 150° for 15 minutes and then raising the temperature to 180–190° until foaming ceases. The non-crystalline residue is dissolved in a minimum amount of hot ethanol and poured onto a suspension of filtercel in ethanol. The mixture is filtered and added to 600 g. of polyphosphoric acid at a temperature of 85° while vigorously stirring. The reaction temperature is kept at 90–95° during the addition and then raised to 95–100° for 20 minutes. After cooling, it is poured onto ice, the solution is filtered and the filtrate neutralized with potassium carbonate. The desired 2-(2-dimethylaminoethyl)-3-methyl-indan-1-one is extracted with ether and distilled after the evaporation of the organic solvent, B.P. 135°/1 mm.; yield: 31.5 g.

*Example 18*

A solution of 20 g. of bis-(α-methyl-benzyl)-ether in 150 ml. of dry tetrahydrofuran is added to a very vigorously stirred suspension of 8.5 g. of finely cut lithium wire in 180 ml. of tetrahydrofuran in an atmosphere of dry nitrogen. The reaction mixture is kept at from −5° to −15° by external cooling; the addition is carried out over a period of 6½ hours.

A solution of 7 g. of 2-(2-dimethylaminoethyl)-indan-1-one in 50 ml. of tetrahydrofuran is added to the α-methyl-benzyl lithium solution with continued cooling; the reaction mixture is allowed to warm up to room temperature and stand overnight. The excess lithium metal is filtered off; the filtrate is treated dropwise with 50 ml. of water while stirring and cooling. The greater part of the tetrahydrofuran is removed by distillation under reduced pressure, the residue is diluted with 50 ml. of water and the organic material is extracted with ether. The ether extract, containing the 2-(2-dimethylaminoethyl)-1-(1-phenylethyl)-indan-1-ol, is treated with 4 N aqueous hydrochloric acid, the acid extract is heated on the steam bath for one hour, then made basic with aqueous ammonia and extracted with ether. The ether extract is dried over sodium sulfate, filtered and the solvent is evaporated. The residue is distilled to yield the 2-(2-dimethylaminoethyl)-3-(1-phenylethyl)-indene, B.P. 158–160°/0.05 mm., which may be converted into its hydrochloride by treating an ethanol solution of the base with a solution of hydrogen chloride in ether and adding additional ether; the hydrochloride of 2-(2-dimethylaminoethyl)-3-(1-phenylethyl)-indene melts at 181–182° after recrystallization from a mixture of ethanol and ether.

The methiodide of 2-(2-dimethylaminoethyl)-3-(1-phenylethyl)-indene, M.P. 250° (decomposition) is prepared according to the procedure given in Example 2 and recrystallized from ethanol.

The resulting compound represents a racemate, which may be resolved into the antipodes according to previously-described procedures, for example, by treating a solution of the d,l-2-(2-dimethylaminoethyl)-3-(1-phenylethyl)-indene, with a solvent, such as for example, ethanol, with the optically active forms of an acid, such as D-tartaric or L-tartaric acid, and isolating one of the antipodes of the base in the form of a tartrate thereof which may be, if desired, converted to the free base according to standard procedures.

Instead of using the 2-(2-dimethylaminoethyl)-indan-1-one as the starting material the 2-(2-dimethylamino-2-methylethyl)-indan-1-one, 6-chloro-2-(2-dimethylaminoethyl)-indan-1-one, 2-(2-dimethylaminoethyl)-3-methyl-indan-1-one or 2-(2-diethylaminoethyl)-indan-1-one may be reacted with the α-methyl-benzyl lithium compound to yield the intermediarily formed 2-(2-dimethylamino-2-methyl-ethyl)-1-(1-phenylethyl)-indan-1-ol, 6-chloro - 2-(2-dimethylaminoethyl)-1-(1-phenylethyl)-indan-1-ol, 2-(2-dimethylaminoethyl)-3-methyl-1-(1-phenylethyl) - indan-1-ol or 2-(2-diethylaminoethyl)-1-(1-phenylethyl)-indan-1-ol, which may be dehydrated by heating on the steam bath in the presence of an aqueous mineral acid, e.g. hydrochloric acid, to the desired 2-(2-dimethyl-2-methyl-ethyl)3-(1-phenylethyl)-indene, 5-chloro-2-(2-dimethylaminoethyl)-3-(1-phenylethyl)-indene, 2 - (2 - dimethylaminoethyl)-1-methyl-3-(1-phenylethyl)-indene or 2-(2-diethylaminoethyl)-3-(1-phenylethyl)-indene, respectively.

*Example 19*

A solution of 8 g. of benzyl methyl ether in 150 ml. of dry tetrahydrofuran is added to a very vigorously stirred suspension of 7.5 g. of finely cut lithium wire in 180 ml. of tetrahydrofuran in an atmosphere of dry nitrogen, and the reaction is carried out as shown in Example 18.

A solution of 7 g. of 2-(2-dimethylaminoethyl)-indane 1-one in 50 ml. of tetrahydrofuran is added to the benzyl lithium solution with continued cooling; the reaction mixture is allowed to warm up to room temperature and stand overnight, and is then worked up as shown in Example 18. The resulting residue is distilled to yield the 3-benzyl-2-(2-dimethylaminoethyl)-indene, B.P. 155–160°/0.3 mm. The hydrochloride, prepared by treating an ethanol solution of the base with hydrogen chloride and precipitating the salt, M.P. 171–172°, is identical with the compound obtained according to Example 1.

An additional possibility to introduce a carbocyclic aryl-lower alkyl radical into a 2-tertiary amino-lower alkyl-indan-1-one compound consists in reacting the latter with the alkali metal salt of an alkali metal carbocyclic aryl-lower alkanoate, and treating the resulting product with an acid. An alkali metal salt of an alkali metal carbocyclic aryl-lower alkanoate is particularly the sodium or lithium salt formed by treating a sodium carbocyclic aryl-lower alkanoate with an alkali metal amide or hydride, e.g. lithium or sodium amide or hydride, or with a monocyclic aryl alkali metal compound, e.g. phenyl lithium or phenyl sodium, in an inert solvent such as an ether, e.g. p-dioxane, or an aromatic hydrocarbon, e.g. benzene, toluene or xylene. The reaction of a 2-tertiary amino-lower alkyl-indan-1-one compound with an alkali metal salt of an alkali metal carbocyclic aryl-lower alkanoate is preferably carried out in the presence of a solvent, for example, p-dioxane. The resulting compound may not be isolated, but directly treated with an acidic reagent, such as an aqueous solution of an inorganic acid, for example, a mineral acid, e.g. hydrochloric or sulfuric acid, if desired, at an elevated temperature, to yield the desired 3-carbocyclic aryl-lower alkyl-2-tertiary amino-lower alkyl-indene.

The new indene compounds of this invention may also be obtained by introducing a carbocyclic aryl-lower alkyl radical into a 2-tertiary amino-lower alkyl-indene compound. For example, a 2-tertiary amino-lower alkyl-indene may be reacted with a carbocyclic aryl-carboxaldehyde or a carbocyclic aryl-lower alkanal in the presence of a basic reagent and the resulting 1-carbocyclic aryl-lower alkylidene-2-tertiary amino-lower alkyl-indene may be converted to the desired 3-carbocyclic aryl-lower alkyl-2-tertiary amino-lower alkyl-indene by reduction, whereby such a compound may be obtained directly or after treatment with a base or an acid. A basic reagent used for the condensation of the indene derivative with the carbocyclic aryl-carboxaldehyde or carbocyclic aryl-lower alkanal is particularly an alkali metal lower alkanolate, e.g. lithium, sodium or potassium methylate, ethylate, propylate, isopropylate or n-butylate, used in solution, preferably in the corresponding lower alkanol or in an inert solvent, such as, for example, in an aromatic hydrocarbon, e.g. benzene or toluene. An alkali metal, e.g. sodium, in an inert solvent; an alkali metal hydroxide, e.g. lithium or sodium hydroxide, in a lower alkanol; or an alkali metal amide or hydride, e.g. lithium or sodium amide or hydride, in an inert solvent may be used as well.

The reduction of a resulting 1-carbocyclic aryl-lower alkylidene-2-tertiary amino-lower alkyl-indene may be carried out by treatment with a hydrogenating agent, such as by catalytic hydrogenation until one mole of hydrogen is adsorbed, e.g. treatment with hydrogen in the presence of a catalyst containing a metal of the eighth group of the periodic system, e.g. palladium on charcoal, preferably used in a lower alkanol, e.g. ethanol, etc.; or by treatment with hydrogen in statu nascendi, such as a metal or a metal amalgam in the presence of a hydrogen donor, e.g. aluminum amalgam in the presence of wet ether, etc.

The product resulting from the reduction procedure may be the desired 3-carbocyclic aryl-lower alkyl-2-tertiary amino-lower alkyl-indene compounds or the latter may be obtained after rearrangement of a double bond in the reduction product with an acid. Treatment with a mineral acid, e.g. hydrochloric or sulfuric acid, or with a base, such as an alkali metal hydroxide, e.g. sodium or potassium hydroxide, or an alkali metal lower alkanolate, e.g. sodium or potassium methylate or ethylate, may bring about the rearrangement of a double bond. These reagents are preferably used in the presence of solvents, such as, for example, water or lower alkanols or aqueous mixtures thereof, depending on the solubility and/or reactivity of the reagent or the reactant.

The 2-tertiary amino-lower alkyl-indene compounds used as the starting materials in the above reaction are known or may be obtained according to methods used for the preparation of known analogs. For example, an indan-2-one compound may be reacted with a tertiary amino-lower alkyl-Grignard reagent according to previously outlined methods to yield a 2-tertiary amino-lower alkyl-indan-2-ol, which may be dehydrated by reaction with an acid, for example, with a mineral acid, e.g. hydrochloric acid. Or, a 2-tertiary amino-lower alkyl-indan-1-one may be reduced to the corresponding indan-1-ol compound, for example, by treatment with catalytically activated hydrogen, such as hydrogen in the presence of a nickel, e.g. Raney nickel, or a palladium, e.g. palladium on charcoal, catalyst, with hydrogen in statu nascendi, such as treatment with a metal in the presence of a hydrogen donor, with an alkali metal borohydride or an alkali metal aluminum hydride, or with an aluminum lower alkoxide in the presence of a lower alkanol according to the Meerwein-Ponndorf-Verley method, for example, with aluminum isopropoxide in isopropanol. A resulting 2-tertiary amino-lower alkyl-indan-1-ol is then dehydrated, for example, in the presence of an acid to yield the desired 2-tertiary amino-lower alkyl-indene compound used as an intermediate.

A modification of the above method comprises introducing a carbocyclic aryl-lower alkyl radical into a 2-tertiary amino-lower alkyl-inden-1-one compound, in which the 3-position is substituted with a lower alkoxy, e.g. methoxy, group, having the reactivity of an enol ether group. As reagents to introduce a carbocyclic aryl-lower alkyl radical there may be used those outlined hereinbefore, i.e. carbocyclic aryl-lower alkyl metal halides under the Grignard reaction conditions or carbocyclic aryl-lower alkyl metal compounds in an inert solvent, which reagents may be used according to the methods outlined hereinbefore. In a resulting product a free hydroxyl group attached to the 3-position may be removed by dehydration, for example, by treatment with an acid, such as a mineral acid, e.g. hydrochloric or sulfuric acid and/or hydrogenation, such as according to one of the hydrogenation procedures described hereinabove, for example, catalytic A lower alkoxy group attached to the 1-position, i.e. the enol ether group, may be converted into an oxo group according to methods used for splitting an enol ether group, for example, by treatment with an acid, particularly a strong inorganic acid, such as a mineral acid, e.g. sulfuric, hydrochloric, or especially, hydrobromic acid. The resulting oxo group may then be reduced to a hydroxyl group, for example, by treatment with catalytically activated hydrogen, hydrogen in statu nascendi, an alkali metal aluminum hydride, an alkali metal borohydride, or an aluminum lower alkoxide, which procedures have been outlined in details hereinbefore. Upon dehydration, for example, by treatment with an acidic reagent, such as a mineral acid, e.g. sulfuric or hydrochloric acid, a resulting 3-carbocyclic aryl-lower alkyl-2-tertiary amino-lower alkyl-indan-1-ol yields the desired 3-carbocyclic aryl-lower alkyl-2-tertiary amino-lower alkyl-indene directly or after rearrangement of a double bond, which may be achieved as outlined hereinbefore.

The 2-tertiary amino-lower alkyl-indan-1-one compounds containing a lower alkoxy group attached to the 3-position, which are used as the starting material in the above reaction, may be obtained, for example, by reacting a lower alkyl phthalate, e.g. ethyl phthalate, with a tertiary amino-lower alkyl-nitrile, in which the tertiary amino group is separated from the nitrile group by at least three carbon atoms, in the presence of a base, such as, for example, an alkali metal lower alkanolate, e.g. sodium or potassium methylate, ethylate, n-propylate or n-butylate. The resulting 2-tertiary amino-lower alkyl-indan-1,3-dione is then converted to the desired mono-enol lower alkyl ether by treatment with a lower alkanol, e.g. methanol, in the presence of an acid, such as a mineral acid, e.g. hydrochloric or sulfuric acid, or by treatment with a diazo-lower alkane, e.g. diazo-methane, in an ether, e.g. diethyl ether, solution.

An additional generally applicable method to form the 3-carbocyclic aryl-lower alkyl-2-tertiary amino-lower alkyl-indene compounds of this invention consists in introducing the tertiary amino group or the tertiary amino-lower alkyl radical into a 3-carbocyclic aryl-lower alkyl-2-reactive esterified hydroxy-lower alkyl-indene, in which the reactive esterified hydroxy group is separated from the 2-position of the indene nucleus by at least two carbon atoms, or into a 1-carbocyclic aryl-lower alkyl-indan-2-one, respectively.

For example, by treating a 3-carbocyclic aryl-lower alkyl-2-reactive esterified hydroxy-lower alkyl-indene with a secondary amine or a salt thereof the 3-carbocyclic aryl-lower alkyl-2-tertiary amino-lower alkyl-indene compounds of this invention may be formed. A reactive esterified hydroxyl group is more particularly a hydroxyl group esterified with a strong inorganic acid, such as a mineral acid, e.g. hydrochloric, hydrobromic, hydriodic or sulfuric acid, or with a strong organic acid, such as an aryl sulfonic acid, e.g. p-toluene sulfonic acid. The preferred starting materials are 3-carbocyclic aryl-lower alkyl-2-halogeno-lower alkyl-indenes, in which the halogen atom, e.g. chlorine or bromine, is separated from the 2-position of the indene nucleus by at least two carbon atoms; secondary amines are those which furnish the tertiary amino groups described in detail hereinabove. The reaction is preferably carried out in the presence of a solvent, such as a lower alkanol, e.g. methanol, ethanol, propanol or higher homologs; a hydrocarbon, such as an aromatic hydrocarbon, e.g. benzene or toluene, or a halogenated aliphatic hydrocarbon, e.g. chloroform, and/or, if desired, in the presence of an acid neutralizing reagent, such as an alkali metal hydroxide, e.g. sodium hydroxide, or an alkali metal carbonate, e.g. sodium or potassium carbonate or hydrogen carbonate. The reaction may be completed by elevating the temperature, for example, to the boiling point of the used solvent.

A 3-carbocyclic aryl-lower alkyl-2-reactive esterified hydroxy-lower alkyl-indene compound used as the starting material in the above reaction may be prepared, for example, by reacting an alkali metal, e.g. sodium, salt of an α-benzyl-malonic acid ester, such as one of those outlined hereinbefore, with an etherified hydroxy-lower alkyl halide, in which the etherified hydroxy group and the halogen atom are separated by at least two carbon atoms. An etherified hydroxyl group is particularly a lower alkoxy group, e.g. methoxy or ethoxy, or a monocyclic aryloxy group, e.g. phenoxy; a halide is particularly a chloride or a bromide. The resulting α-benzyl-α-etherified hydroxy-lower alkyl-malonic acid ester is then cyclized, if desired, prior or after hydrolysis and decarboxylation, to a 2-etherified hydroxy-lower alkyl-indan-1-one, according to known methods. The carbocyclic aryl-lower alkyl radical is introduced into the indan-1-one compound according to one of the previously described methods, and the resulting 3-carbocyclic aryl-lower alkyl-2-etherified hydroxy-lower alkyl-indene, which may be obtained after subsequent dehydration, is then treated with an ether splitting reagent, for example, a mineral acid, such as a hydrohalic acid, e.g. hydrochloric or hydrobromic acid. The 3-carbocyclic aryl-lower alkyl-2-reactive esterified hydroxy-lower alkyl-2-indene may be obtained directly upon treatment with the acid reagent, or by treatment with a reagent capable of converting a hydroxyl group into a reactive esterified hydroxyl group, for example, with a thionyl halide, e.g. thionyl chloride, in solution with an inert solvent, such as an aromatic hydrocarbon, e.g. benzene or toluene.

This reaction sequence may be modified; for example, the alkali metal salt of an α-benzyl-malonic acid ester may be treated with a lower alkylene oxide, e.g. ethylene oxide, to form an α-benzyl-α-hydroxy-lower alkyl-malonic acid ester, which may be hydrolyzed, decarboxylized and cyclized to a 2-hydroxy-lower alkyl-indan-1-one compound in which the hydroxy group is separated from the 2-position of the indane nucleus by at least two carbon atoms. A resulting indan-1-one compound is then converted into the desired 3-carbocyclic aryl-lower alkyl-2-reactive esterified hydroxy-lower alkyl-indene derivative, for example, by introducing the carbocyclic aryl-lower alkyl radical according to one of the previously described procedures and then converting the free hydroxyl group into the reactive esterified hydroxyl group, for example, by treatment with a thionyl halide; these steps may also be in reversed order.

Furthermore, the starting material may be obtained by reacting an indan-2-one with an etherified hydroxy-lower alkyl-Grignard compound, dehydrating the resulting compound to the 2-etherified hydroxy-lower alkyl-indene, into which the carbocyclic aryl-lower alkyl radical may be introduced according to one of the previously outlined procedures, for example, by treatment with a carbocyclic aryl-carboaldehyde or a carbocyclic aryl-lower alkanal. The ether group may then be split by reaction with an acid, the resulting free hydroxyl group is converted into a reactive esterified hydroxyl group, and the carbocyclic aryl-lower alkylidene group be reduced to a carbocyclic aryl-lower alkyl group, whereby the steps may be carried out in any order.

A tertiary amino-lower alkyl group may be introduced into a 1-carbocyclic aryl-lower alkyl-indan-2-one compound according to previously outlined methods; for example, the indan-2-one compound may be reacted with a tertiary-amino-lower alkyl metal halide according to the Grignard procedure as outlined hereinabove, and a resulting 1-carbocyclic aryl-lower alkyl-2-tertiary amino-lower alkyl-indan-2-ol may be converted into the desired indene compound by dehydration, for example, in the presence of an acid, such dehydration being carried out according to previously described methods.

The 1-carbocyclic aryl-lower alkyl-indan-2-ones used as the starting materials in this reaction may be prepared by introducing into an indan-2-one the carbocyclic aryl-lower alkyl radical according to the Claisen procedure, i.e. reaction of a carbocyclic aryl-carboxaldehyde or a carbocyclic aryl-lower alkanal with the reactive methylene group of the indan-2-one compound in the presence of a base, and converting a resulting 1-carbocyclic aryl-lower alkylidene-indan-2-one into the desired starting material by reductive removal of the double bond, if desired, with subsequent reoxidation of any reduced oxo group.

A further possibility to prepare the compounds of this invention comprises ring closure of 1-carbocyclic aryl-lower alkanoyl-1-tertiary amino-lower alkyl-2-monocyclic carbocyclic aryl-ethane, in which the carbocyclic aryl portions may be unsubstituted or substituted as previously described, and the tertiary amino group is separated from the ethane portion by at least two carbon atoms of the lower alkyl radical, by treatment with a strong Lewis acid, such as polyphosphoric acid, at an elevated temperature. The desired 3-carbocyclic aryl-lower alkyl-2-tertiary amino-indenes are obtained directly and are worked up as previously shown.

The starting materials for such a reaction may be obtained as follows: The alkali metal, e.g. sodium or potassium, salt of a lower alkyl carbocyclic aryl-lower alkanoyl-acetate is alkylated with a monocyclic carbocyclic aryl-methyl halide to yield a lower alkyl α-(carbocyclic aryl-lower alkanoyl)-α-(monocyclic carbocyclic aryl-methyl)-acetate, a salt, e.g. sodium salt, which is then alkylated with a tertiary amino-lower alkyl halide, in which the tertiary amino group is separated from the halogen atom by at least two carbon atoms. The resulting lower alkyl α-(carbocyclic aryl-lower alkanoyl)-α-(monocyclic carbocyclic aryl-methyl)-α-(tertiary amino-lower alkyl)-acetate is then hydrolyzed and decarboxylated with acid to yield the desired 1-carbocyclic aryl-lower alkanoyl-1-tertiary amino-lower alkyl-2-monocyclic carbocyclic aryl-ethane, which can be converted to the indene as previously shown.

The desired starting material may also be obtained by hydrolyzing and decarboxylating di-lower alkyl α-(monocyclic carbocyclic aryl-methyl)-α-(tertiary amino-lower alkyl)-malonate, in which the tertiary amino group is separated from the α-position by at least two carbon atoms, to the lower alkyl α-(monocyclic carbocyclic aryl-methyl)-α-(tertiary amino-lower alkyl)-acetate. The latter is then treated with a carbocyclic aryl-lower alkyl Grignard reagent, such as a carbocyclic aryl-lower alkyl-magnesium halide, to yield the desired intermediate 1-carbocyclic aryl-lower alkanoyl-1-tertiary amino-lower alkyl-2-monocyclic carbocyclic aryl-ethane.

This procedure is illustrated by the following example:

*Example 20*

0.5 g. of 3-benzyl-5-dimethylamino-1-phenyl-pentan-2-one is dissolved in 10 ml. of polyphosphoric acid and heated for 20 minutes at 120°. The reaction mixture is decomposed with ice, made basic with potassium carbonate and extracted with ether. The ether solution is dried, the solvent evaporated off and the residue chromatographed on aluminum. The desired 3-benzyl-2-(2-dimethylaminoethyl)-indene is eluted from the column with benzene, the solvent is evaporated and the 3-benzyl-2-(2-dimethylaminoethyl)-indene hydrochloride is prepared from the residue by treatment of an ethanol solution of the latter with hydrogen chloride and subsequent addition of ether.

The identity of the products described in Example 1 and in the above example may be determined by paper chromatography using the system of 95% benzene–5% chloroform as the mobile phase and Whatman No. 1 paper impregnated with formamide containing 1% of benzoic acid as the stationary phase. The desired 3-benzyl-2-(2-dimethylaminoethyl)-indene appears at Rf 0.43, and, if desired, may be leached from the paper.

The starting material in the above reaction may be prepared as follows: A mixture of 100 g. of diethyl α-benzyl-α-(2-dimethylaminoethyl)-malonate, 17.5 g. of potassium hydroxide and 500 ml. of methanol is refluxed for 55 hours. Most of the methanol is removed under reduced pressure, the residue is diluted with water and extracted with ether. The ether extract is dried over sodium sulfate, the solvent is evaporated and the residue distilled to yield the ethyl α-(2-dimethylaminoethyl)-β-phenyl-propionate, B.P. 96–100°/0.25 mm.

A solution of 30 g. of ethyl α-(2-dimethylaminoethyl)-β-phenyl-propionate in 100 ml. of ether is added to a Grignard reagent prepared from 7.8 g. of magnesium and 41 g. of benzyl chloride in 200 ml. of ether. The mixture is refluxed for 12 hours, 100 ml. of dry tetrahydrofuran is added and refluxing is continued for another 12 hours. An excess of ethyl acetate is added to decompose the Grignard reagent, followed by the addition of a large amount of saturated aqueous ammonium chloride to decompose the organic magnesium salts. The ether layer is separated, the solvent is removed by evaporation and the residue is distilled at 143–147°/0.25 mm. yielding 3-benzyl-5-dimethylamino-1-phenylpentan-2-one.

In resulting indene compounds functional groups attached to the aromatic portions may be converted into other functional groups: a nitro group may be reduced to an amino group; a nitro or primary amino group may be reductively alkylated to form secondary or tertiary amino groups; an amino group may be diazotized and converted to halogen according to the Sandmeyer method; a hydroxyl group may be etherified, for example, by treatment with a diazo-lower alkane, e.g. diazomethane, or esterified to a lower alkanoyloxy group, for example, with acetyl chloride to an acetoxy group, etc.

*Example 21*

The compounds of the present invention may be used in pharmaceutical preparations, which may be obtained according to the previously described general methods. For example, the 3-benzyl-2-(2-dimethylaminoethyl)-indene hydrochloride may be used in tablets containing 0.01 g. of the active ingredient, which are manufactured according to the following procedure (for 10,500 tablets).

Ingredients: G.
3 - benzyl - 2-(2-dimethylaminoethyl)-indene hydrochloride _____ 105.00
Corn starch_____ 105.00
Lactose spray dried_____ 834.75
Magnesium stearate _____ 5.25

The 3-benzyl-2-(2-dimethylaminoethyl)-indene hydrochloride is triturated with the corn starch and forced through a 50 mesh screen. All ingredients are mixed together and compressed into tablets of 0.1 g. by using ⁸⁄₃₂″ punches and dies.

What is claimed is:
1. A member selected from the group consisting of a compound of the formula:

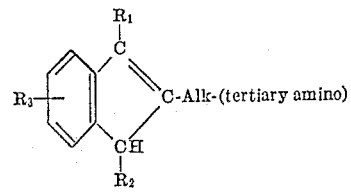

in which $R_1$ is a member selected from the group consisting of phenyl-lower alkyl, (lower alkyl-phenyl)-lower alkyl, (lower alkoxy-phenyl)-lower alkyl, (lower alkylenedioxy-phenyl)-lower alkyl, (halogeno-phenyl)-lower alkyl, (lower alkyl-mercapto-phenyl)-lower alkyl, (nitro-phenyl)-lower alkyl, (N,N-di-lower alkylamino-phenyl)-lower alkyl and naphthyl-lower alkyl, $R_2$ stands for a member selected from the group consisting of hydrogen and lower alkyl, $R_3$ is a member selected from the group consisting of hydrogen, halogeno, lower alkoxy, lower alkyl, nitro and amino, -(tertiary amino) is a member selected from the group consisting of N,N-di-lower alkyl-amino, N,N-lower alkylene-imino, in which lower alkylene has from four to six carbon atoms, morpholino, thiamorpholino and 4-methyl-piperazino, and Alk is lower alkylene separating the tertiary amino group from the 2-position of the indene nucleus by at least two carbon atoms, addition salts thereof with therapeutically acceptable acids and lower alkyl quaternary ammonium salts thereof.

2. 3-benzyl-2-di-lower alkyl-amino-lower alkyl-indene, in which the di-lower alkyl-amino group is separated from the 2-position of the indene portion by two to three carbon atoms.

3. 3-benzyl-2-(2-dimethylaminoethyl)-indene.

4. 3-benzyl-2-(2-dimethylaminoethyl)-indene hydrochloride.

5. 3-benzyl-2-(2-dimethylamino-2-methyl-ethyl)-indene maleate.

6. 3-benzyl-2-(2-dimethylaminoethyl)-3-methyl-indene.

7. 2-di-lower alkyl - amino - lower alkyl-3-(1-phenyl-ethyl)-indene, in which the di-lower alkyl-amino group is separated from the 2-position of the indene portion by two to three carbon atoms.

8. 2-(2-dimethylaminoethyl)-3-(1-phenylethyl)-indene.

9. 2-(2-dimethylaminoethyl)-3-(1-phenylethyl)-indene hydrochloride.

10. A member selected from the group consisting of a compound of the formula:

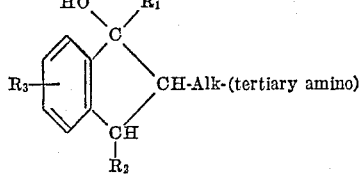

in which $R_1$ is a member selected from the group consisting of phenyl-lower alkyl, (lower alkyl-phenyl)-lower alkyl, (lower alkoxy-phenyl)-lower alkyl, (lower alkylenedioxy-phenyl)-lower alkyl, (halogeno-phenyl)-lower alkyl, (lower alkyl-mercapto-phenyl)-lower alkyl, (nitro-phenyl)-lower alkyl, (N,N-di-lower alkylamino-phenyl)-lower alkyl and naphthyl-lower alkyl, $R_2$ stands for a member selected from the group consisting of hydrogen and lower alkyl, $R_3$ is a member selected from the group consisting of hydrogen, halogeno, lower alkoxy, lower alkyl, nitro and amino, -(tertiary amino) is a member selected from the group consisting of N,N-di-lower alkylamino, N,N-lower alkylene-imino, in which lower alkylene has from four to six carbon atoms, morpholino, thiamorpholino and 4-methyl-piperazino, and Alk is lower alkylene separating the tertiary amino group from the 2-position of the indene nucleus by at least two carbon atoms, addition salts thereof with therapeutically acceptable acids and lower alkyl quaternary ammonium salts thereof.

11. 1-benzyl-2-di-lower alkyl-amino-lower alkyl-indan-1-ol, in which the di-lower alkyl-amino group is separated from the 2-position of the indan-1-ol portion by two to three carbon atoms.

12. 2-di-lower alkyl-amino-lower alkyl-1-(1-phenyl-ethyl)-indan-1-ol, in which the di-lower alkyl-amino group is separated from the 2-position of the indan-1-ol portion by two to three carbon atoms.

References Cited in the file of this patent

UNITED STATES PATENTS

| | | |
|---|---|---|
| 2,441,069 | Hoffmann et al. | May 4, 1948 |
| 2,798,888 | Ueberwasser | July 9, 1957 |
| 2,884,456 | Campbell | Apr. 28, 1959 |